(12) United States Patent
Lin et al.

(10) Patent No.: US 7,557,889 B2
(45) Date of Patent: Jul. 7, 2009

(54) LIQUID CRYSTAL PANEL STRUCTURE FOR SINGLE DISPLAY MODULE HAVING SECOND CONTACT TERMINALS FORMED AROUND FIRST CONTACT TERMINALS

(75) Inventors: Jin-Lan Lin, Tainan County (TW); Kuan-Yu Liu, Tainan County (TW)

(73) Assignee: Chi Mei Optoelectronics Corp., Tainan (TW)

( * ) Notice: Subject to any disclaimer, the term of this patent is extended or adjusted under 35 U.S.C. 154(b) by 0 days.

(21) Appl. No.: 11/855,214

(22) Filed: Sep. 14, 2007

(65) Prior Publication Data

US 2008/0002133 A1 Jan. 3, 2008

Related U.S. Application Data

(62) Division of application No. 11/175,201, filed on Jul. 7, 2005, now abandoned.

(30) Foreign Application Priority Data

Jul. 7, 2004 (TW) .................................. 93120307

(51) Int. Cl.
*G02F 1/1345* (2006.01)

(52) U.S. Cl. ...................... 349/152; 349/149; 349/150; 349/151

(58) Field of Classification Search .......... 349/149–152
See application file for complete search history.

(56) References Cited

U.S. PATENT DOCUMENTS

| 5,712,493 | A  | * | 1/1998  | Mori et al. ..................... 257/59  |
| 6,665,039 | B1 | * | 12/2003 | Glownia et al. ............. 349/153      |
| 2002/0191140 | A1 | * | 12/2002 | Eguchi et al. ............... 349/149 |
| 2003/0227593 | A1 | * | 12/2003 | Miki et al. .................. 349/151 |
| 2005/0146486 | A1 | * | 7/2005  | Lim et al. .................... 345/1.1 |

* cited by examiner

*Primary Examiner*—Andrew Schechter
*Assistant Examiner*—Lauren Nguyen (57) ABSTRACT

A liquid crystal panel structure includes a liquid crystal panel, a plurality of first and second contact terminals, and a plurality of first and second peripheral wirings. The liquid crystal display has a display area and a non-display area. The non-display area has at least one driving chip lamination area. The first and second contact terminals are allocated in the lamination area of the driving chip. The first peripheral wirings are allocated on the non-display area, and the first contact terminals are electrically connected to the pixels of the display area. The liquid crystal panel can selectively provides allocation of two types of driving chips, such that the liquid crystal panel can be applied to single or dual display module.

10 Claims, 8 Drawing Sheets

FIG. 8

LIQUID CRYSTAL PANEL STRUCTURE FOR SINGLE DISPLAY MODULE HAVING SECOND CONTACT TERMINALS FORMED AROUND FIRST CONTACT TERMINALS

This application is a divisional application of U.S. patent application Ser. No. 11/175,201, filed on Jul. 7, 2005 now abandoned.

BACKGROUND OF THE INVENTION

1. Field of Invention

The present invention relates in general to a liquid crystal panel structure, and more particularly, to a structure of a liquid crystal display suitably used in a single display module or a dual display module.

2. Related Art

The demand of being light, thin, short and small for modern electronic products has rendered various kinds of electronic components to be designed and fabricated with smaller volumes. On the other hand, the more and more powerful function of the electronic products allows the conventional electronic devices to be made with much improved portability. For example, various palm or handheld devices such as the cell phones, personal digital assistants (PDAs) and game boys have become the mainstreams in the market.

Currently, the commonly seen cell phones do not only include the upright model of which an operation interface (key panel) and a display screen formed on the same panel, but also include the clamshell type of which the operation panel and the display screen can be folded face to face with each other. Compared to the upright model, the clamshell cell phone has advantages such as smaller volume and larger display screen. Recently, the clamshell cell phone may further comprise two screens, including one smaller screen formed on the exterior side of the cell phone which displays time or incoming call.

Figure 1:
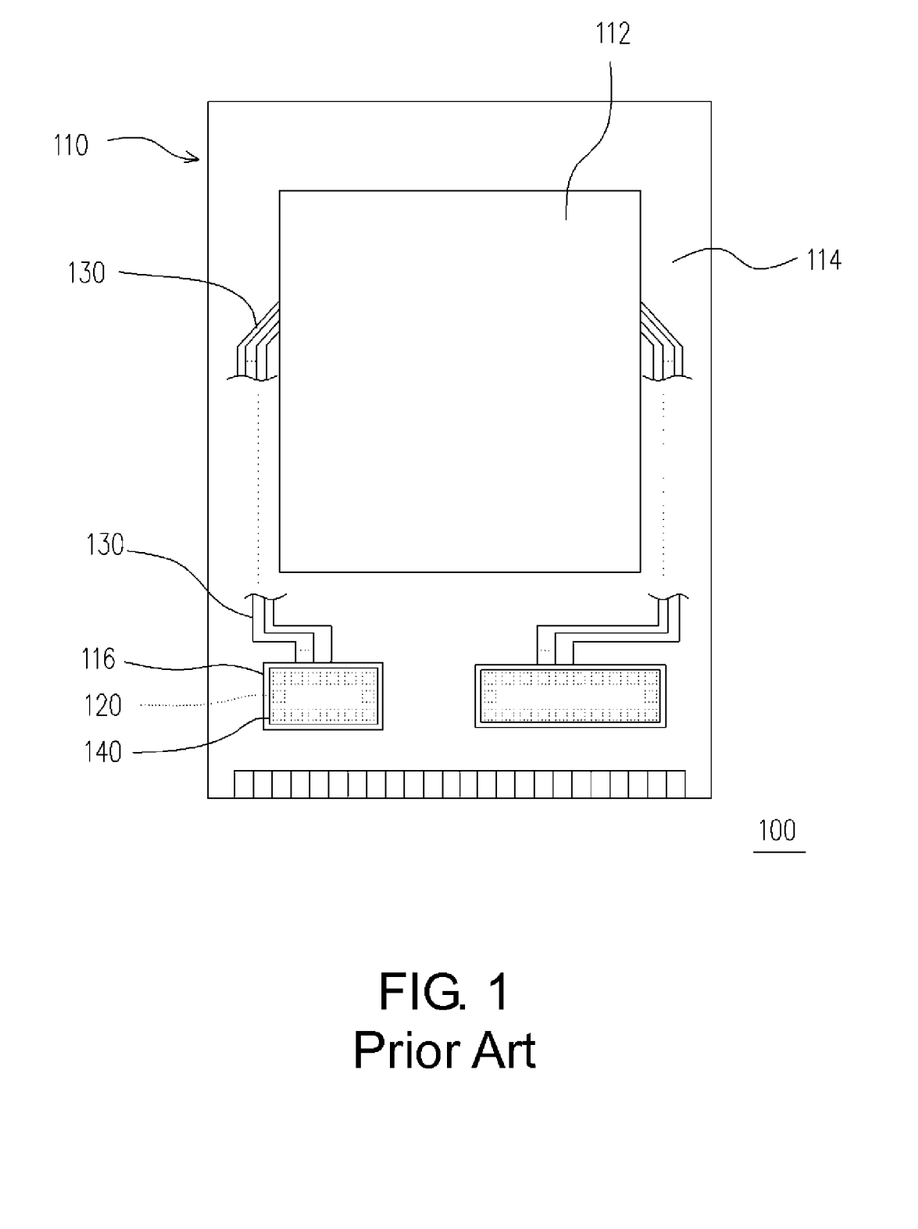
FIG. 1 shows a conventional single display module.

FIG. 1 shows a conventional single display module 100 comprising a liquid crystal panel 110, a plurality of contact terminals 120, a plurality of peripheral wirings 130 and a driving chip 140.

The liquid crystal panel 110 includes a display area 112 and a non-display area 114 which comprises a driving chip lamination area 116 (two in FIG. 1). The contact terminals 120 are allocated in the driving chip lamination area 116. The peripheral wirings 130 are allocated on the non-display area, so as to electrically connect the contact terminals 120 on the driving chip lamination area 116 and the pixels (not shown) on the display area 112. The driving chip 140 is electrically connected to the contact terminals 120 on the driving chip lamination area 116 to drive the liquid crystal panel 110.

As the conventional single liquid crystal module 100 does not have additional wiring on the liquid crystal panel 110, the liquid crystal panel 110 cannot be combined with another liquid crystal panel. That is, the single display module 100 cannot be expanded into a dual display module.

Figure 2:
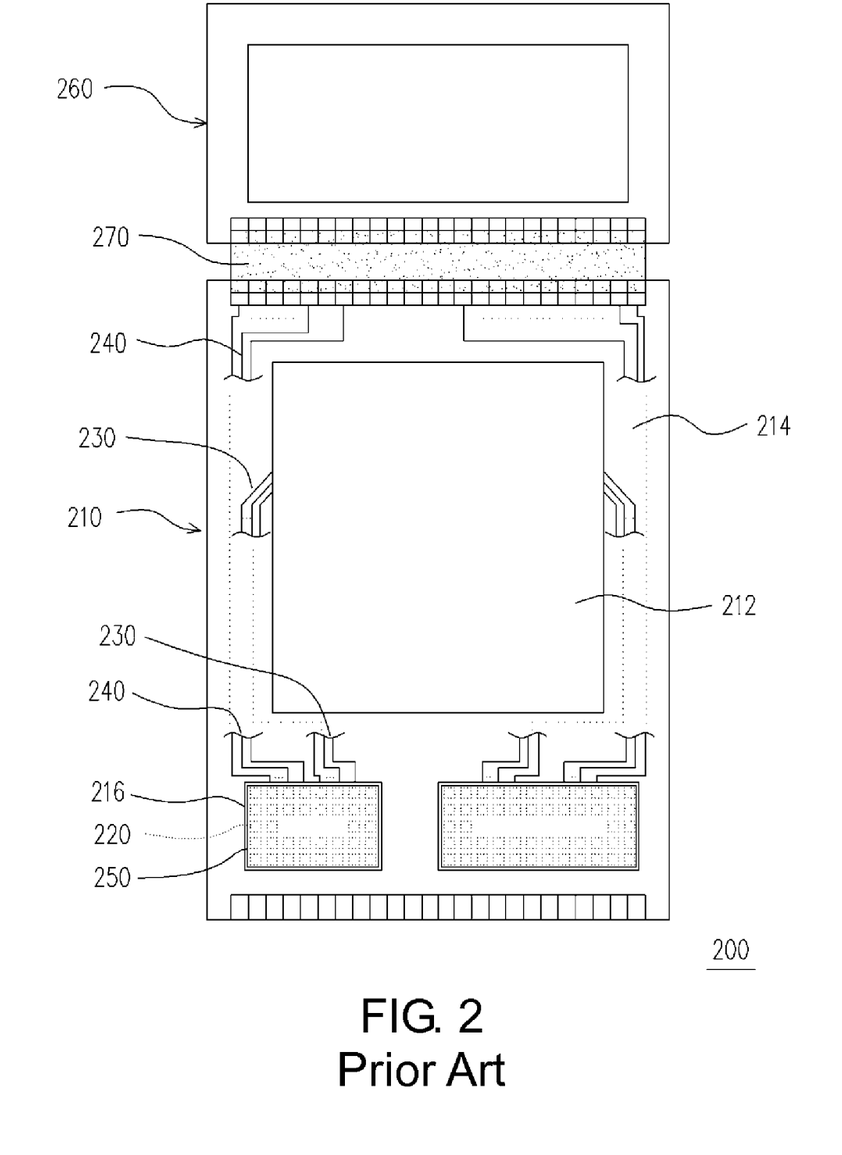
FIG. 2 shows a conventional dual display module.

FIG. 2 illustrates a conventional dual display module 200 that comprises a first liquid crystal display 210 (the main screen), a plurality of contact terminals 220, a plurality of first and second peripheral wirings 230 and 240, a driving chip 250 and a second liquid crystal panel 260 (the auxiliary screen).

The first liquid crystal panel 210 includes a display area 212 and a non-display area 214. The non-display area 214 includes a driving chip lamination area 216 and a plurality of contact terminals 220 allocated in the driving chip lamination area 216. The first and second peripheral wirings 230 and 240 are allocated in the non-display area. The first peripheral wirings 230 are electrically connected to a part of the contact terminals 220 in the driving chip lamination area 216 and a plurality of pixels in the display area 212. The second peripheral wirings 240 have one end connected to the remaining contact terminals 220 in the driving chip lamination area 216 and a second end electrically connected to the second liquid crystal panel 216 via a soft circuit film 270. The driving chip 250 is allocated in the driving chip lamination area 216 to electrically connect the contact terminals 220 in the driving chip lamination area 216, so as to drive the first and second liquid crystal panels 210 and 260.

In the conventional dual module 220, the first liquid crystal panel 210 can only be used simultaneously with the second crystal panel 260. That is, the first liquid crystal panel 210 cannot be independently activated. In other words, if the second liquid crystal panel 260 is removed from the conventional dual display module 200, the first liquid crystal panel 210 cannot operate to display due to the requirement and restriction of simultaneous activation of both the first and second liquid crystal panels 210 and 260.

SUMMARY OF THE INVENTION

The present invention is to provide a liquid crystal panel structure allowing allocation of driving chips with two different driving modes, such that a screen display module selectively operates as a single and a dual display module can be obtained.

In one aspect, a liquid crystal panel structure of the present invention includes a liquid crystal panel, a plurality of first contact terminals, a plurality of second contact terminals, a plurality of first peripheral wirings and a plurality of second peripheral wirings. The liquid crystal panel has a display area and a non-display area. The display area has a plurality of pixels and the non-display area has at least one driving chip lamination area. The first contact terminals are allocated in the driving chip lamination area. The second contact terminals are allocated in the driving chip lamination area. The first peripheral wirings are allocated in the non-display area to be electrically connected to the pixels of the display area. The second peripheral wirings are allocated in the non-display area to electrically connect to the second contact terminals.

Moreover, the liquid crystal panel structure includes a plurality of first connect pads, a plurality of second connect pads and a plurality of anti-corrosion metal lines. The first contact pads may be allocated on the non-display area to electrically connect to the first and the second contact terminals. The second contact pads may be allocated on the non-display area to electrically connect the second peripheral wirings. Each anti-corrosion metal lines may be allocated between one of the second peripheral wirings and one of the second contact pads, so as to electrically connect the second peripheral wiring and the second contact pad.

In another aspect, a dual display module of the present invention includes a first liquid crystal panel, a plurality of first contact terminals, a plurality of second contact terminals, a plurality of first peripheral wirings, a plurality of second peripheral wirings, a second liquid crystal panel and at least one driving chip. The first liquid crystal panel has a display area and a non-display area. The display area has a plurality of pixels and the non-display area has at least one driving chip lamination area. The first contact terminals are allocated in the driving chip lamination area. The second contact terminals are allocated in the driving chip lamination area. The first peripheral wirings are allocated in the non-display area to be electrically connected to the pixels of the display area. The second peripheral wirings are allocated in the non-display area to electrically connect to the second contact terminals. The second liquid crystal panel is electrically connected to the second peripheral wirings. The driving chip is allocated on the driving chip lamination area and electrically connected to the first and the second contact terminals to drive the first and the second liquid crystal panel.

Moreover, the dual display module includes a plurality of first connect pads, a plurality of second connect pads and a plurality of anti-corrosion metal lines. The first contact pads may be allocated on the non-display area to electrically connect to the first and the second contact terminals. The second contact pads may be allocated on the non-display area to electrically connect the second peripheral wirings. Each anti-corrosion metal lines may be allocated between one of the second peripheral wirings and one of the second contact pads, so as to electrically connect the second peripheral wiring and the second contact pad.

Still in another aspect, a single display module of the present invention includes a liquid crystal panel, a plurality of first contact terminals, a plurality of second contact terminals, a plurality of first peripheral wirings, a plurality of second peripheral wirings and at least one driving chip. The liquid crystal panel has a display area and a non-display area. The display area has a plurality of pixels and the non-display area has at least one driving chip lamination area. The first contact terminals are allocated in the driving chip lamination area. The second contact terminals are allocated in the driving chip lamination area. The first peripheral wirings are allocated in the non-display area to be electrically connected to the pixels of the display area. The second peripheral wirings are allocated in the non-display area to electrically connect to the second contact terminals. The driving chip is allocated on the driving chip lamination area and electrically connected to the first and the second contact terminals to drive the liquid crystal panel.

Furthermore, the above-mentioned liquid crystal panel structure, dual display module and single module may include a plurality of third contact terminals. The third contact terminals may be allocated on the driving chip lamination area and electrically connected to the first peripheral wirings, the first contact terminals and the pixels of the display area.

The liquid crystal panel includes a driving chip lamination area allocated with two set of contact terminals allowing the driving chips with two different driving modes to be allocated. Thereby, the liquid crystal panel can be independently used or connected to another liquid crystal panel, so as to achieve the switchable feature between the single and the dual display modules.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 3:
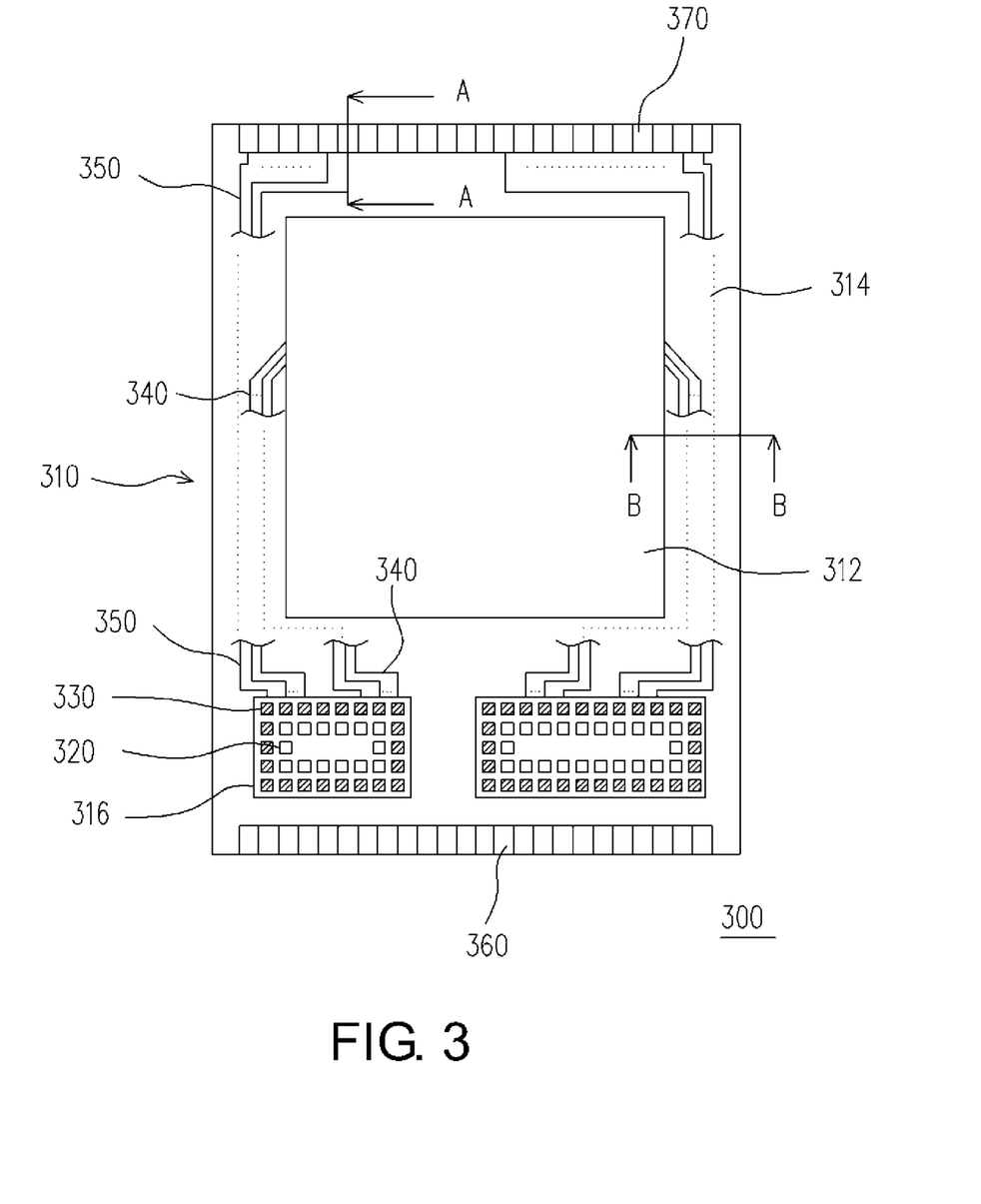
FIG. 3 is a schematic drawing showing an exemplary structure of a liquid crystal panel.

FIG. 3 shows an embodiment of the structure of a liquid crystal panel. As shown, the liquid crystal panel structure 300 includes a first liquid crystal panel (main screen) 310, a plurality of first contact terminals 320, a plurality of second contact terminals 330, a plurality of first peripheral wirings 340 and a plurality of second peripheral wirings 350.

The first liquid crystal panel 310 includes a display area 312 and a non-display area 314 in which at least one driving chip lamination area 316 (two in this embodiment, including a gate driving chip lamination area and source driving chip lamination area). The first contact terminals 320 and the second contact terminals 330 are allocated in each of the driving chip lamination area 316. For example, the second contact terminals 330 are formed around the first contact terminals 320 in this embodiment.

The first peripheral wirings 340 are allocated in the non-display area 314 to electrically connect the first contact terminals 320 in the driving chip lamination area 316 and a plurality of pixels (not shown) in the display area 312. The second peripheral wirings 350 are also allocated in the non-display area 314 to electrically connect the second terminals 330 in the driving chip lamination area 316.

In addition, a plurality of first contact pads 360 is allocated in the non-display area 314 to connect the first and second contact terminals 320 and 330 in the driving chip lamination area 316 via third peripheral wirings (not shown). The first contact pads 360 are preferably used as contact interface for electrically connecting the first liquid crystal panel 310 and a control circuit board (not shown).

The non-display area 314 may further comprise a plurality of second contact pads 370 electrically connected to one end of the second peripheral wirings 350. The second contact pads 370 are used as electrical interface to electrically connect the first liquid crystal 310 with another liquid crystal (not shown).

Figure 4:
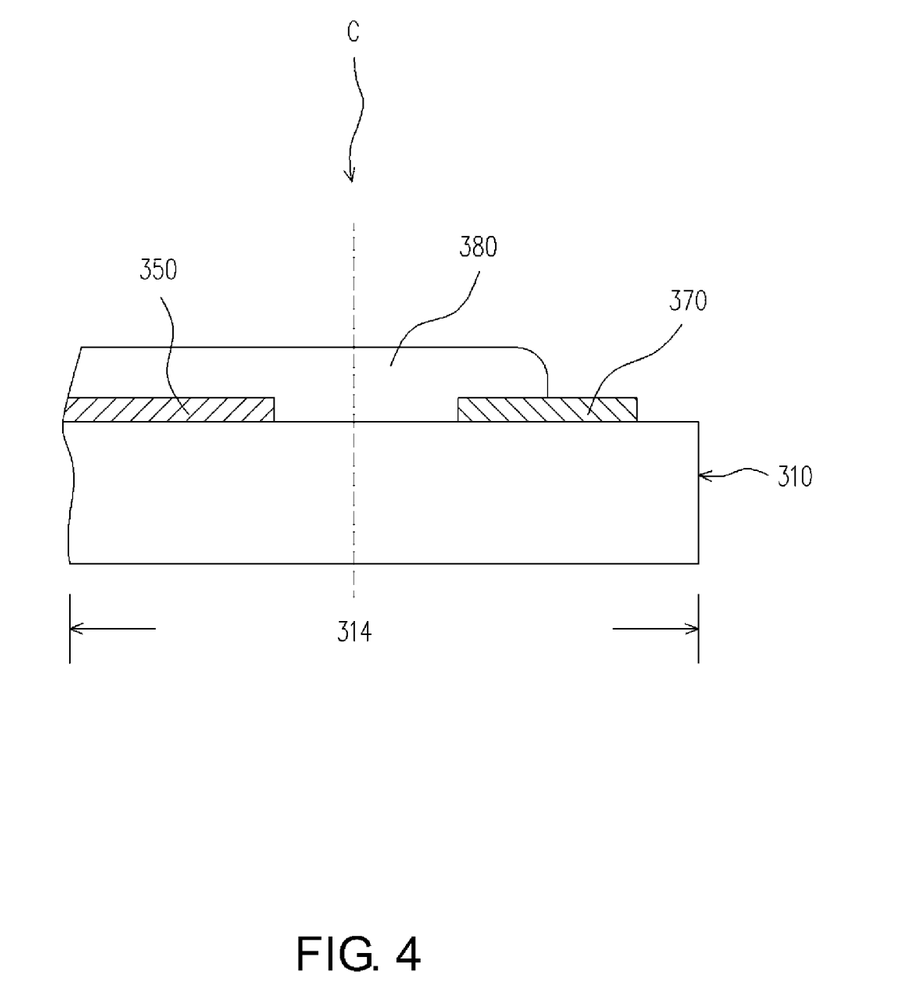
FIG. 4 shows a cross sectional view along line A-A of FIG. 3 of which the anti-corrosion wirings are formed.

FIG. 4 illustrates the cross sectional view along a line A-A as shown in FIG. 3 after anti-corrosion metal lines are formed. Referring to FIGS. 3 and 4, an anti-corrosion metal line 380 is allocated between each of the second peripheral wirings 350 and the corresponding second contact pad 370. The second peripheral wirings 350 and the second contact pads 370 are thus electrically connected to each other via the anti-corrosion metal lines 380. The anti-corrosion metal lines 380 may be fabricated by indium tin oxide (ITO) or other anti-corrosion material. When the liquid crystal panel structure 300 is applied to the single display module, the anti-corrosion metal lines 380 serve for wiring cutting.

Figure 5:
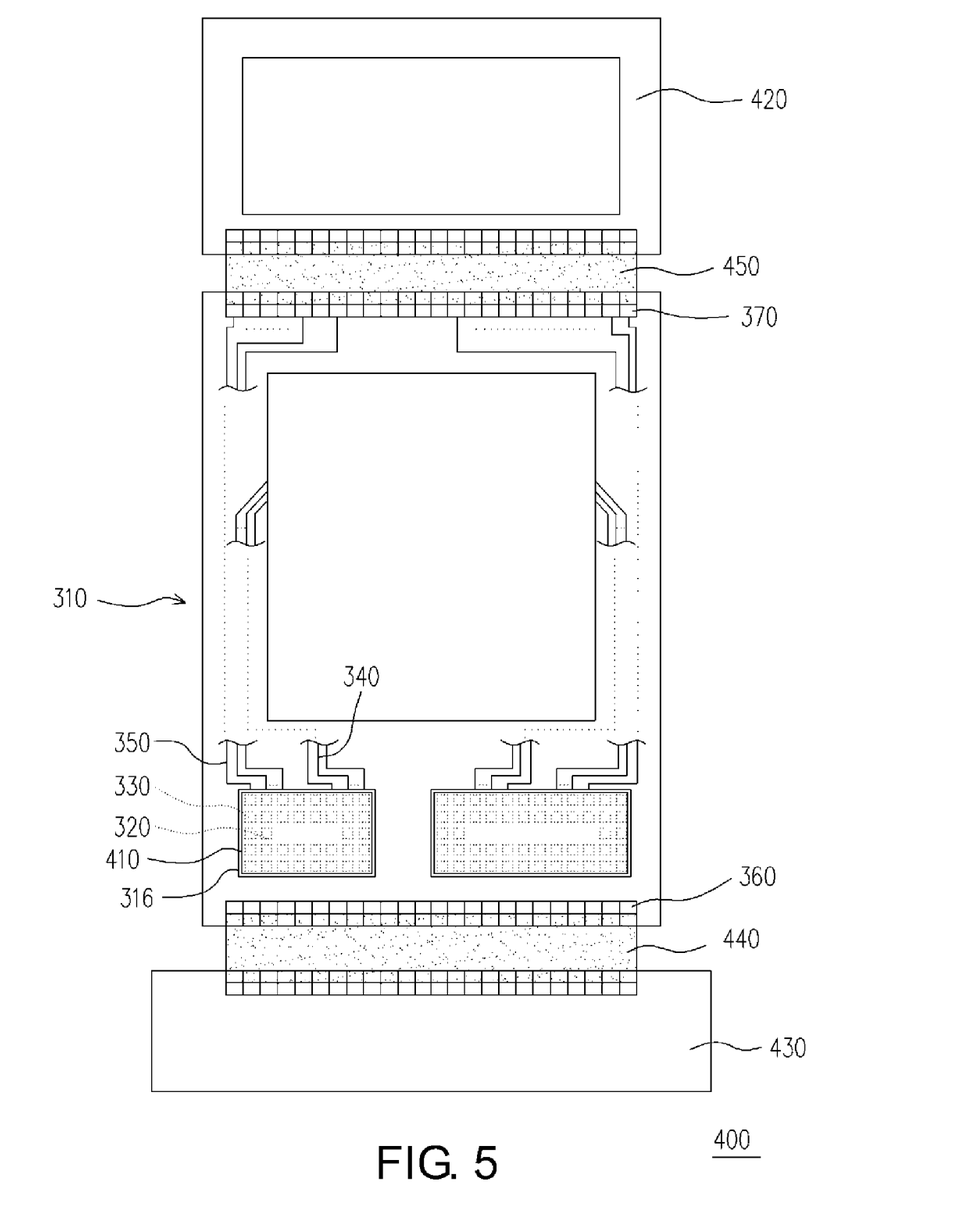
FIG. 5 shows an embodiment of a dual display module.

FIG. 5 shows an embodiment of a dual display module. The dual display module 400 includes the above liquid crystal panel 300, at least one driving chip 410 (two as shown in this embodiment, including a gate driving chip and a source driving chip), a second liquid crystal panel 420 (auxiliary or secondary screen) 420 and a control circuit board 430.

The driving chip 410 is allocated on the driving chip lamination area 316 to electrically connect the first contact terminals 320 and the second contact terminals 330. The first contact pads 360 of the first liquid crystal panel 310 are electrically connected to the control circuit board 430 via a first soft circuit film 440. The second contact pads 370 of the first liquid crystal panel 310 are electrically connected to the second liquid crystal panel 420 via a second soft circuit film 450. As the driving chip 410 is electrically connected to the first and second contact terminals 320 and 330, the driving chip 310 can simultaneously drive the first and second liquid crystal panels 310 and 420 to achieve the dual display function.

Figure 6:
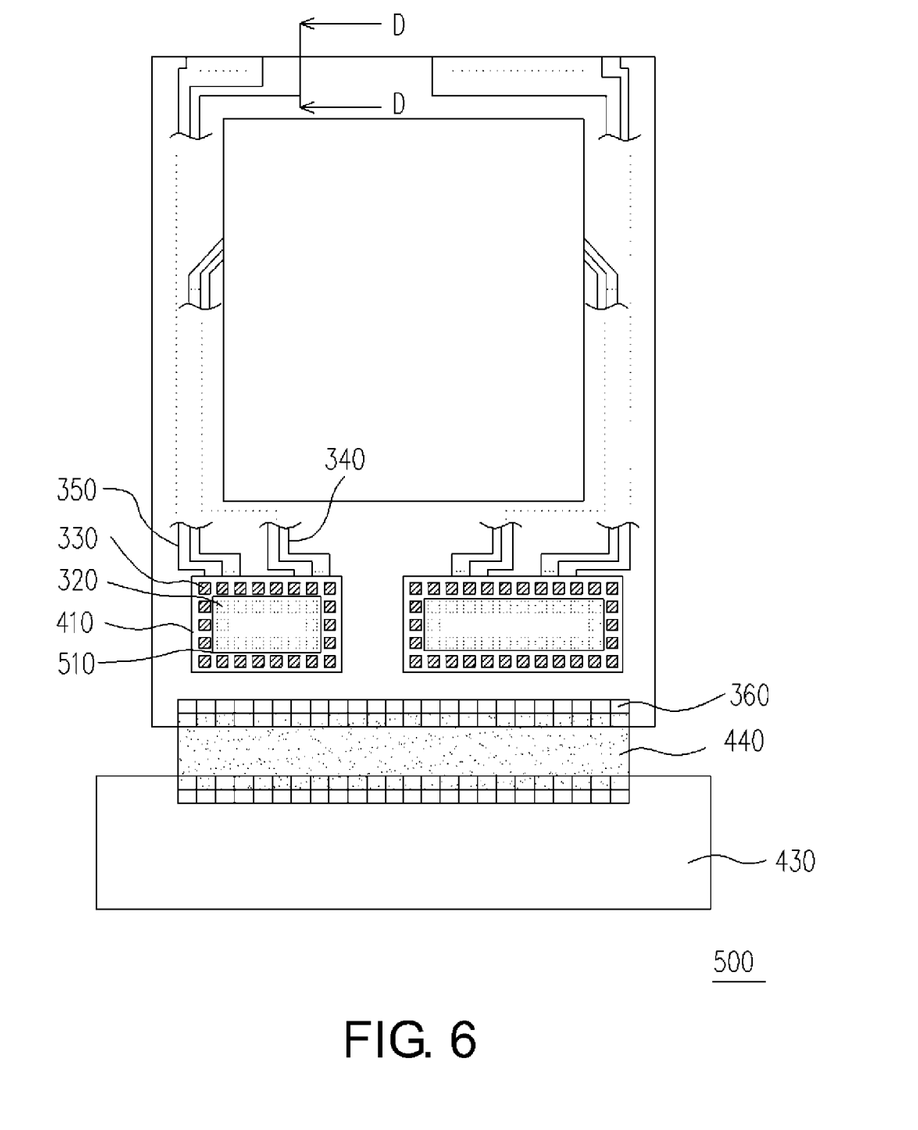
FIG. 6 shows an embodiment of a single display module.
Figure 7:
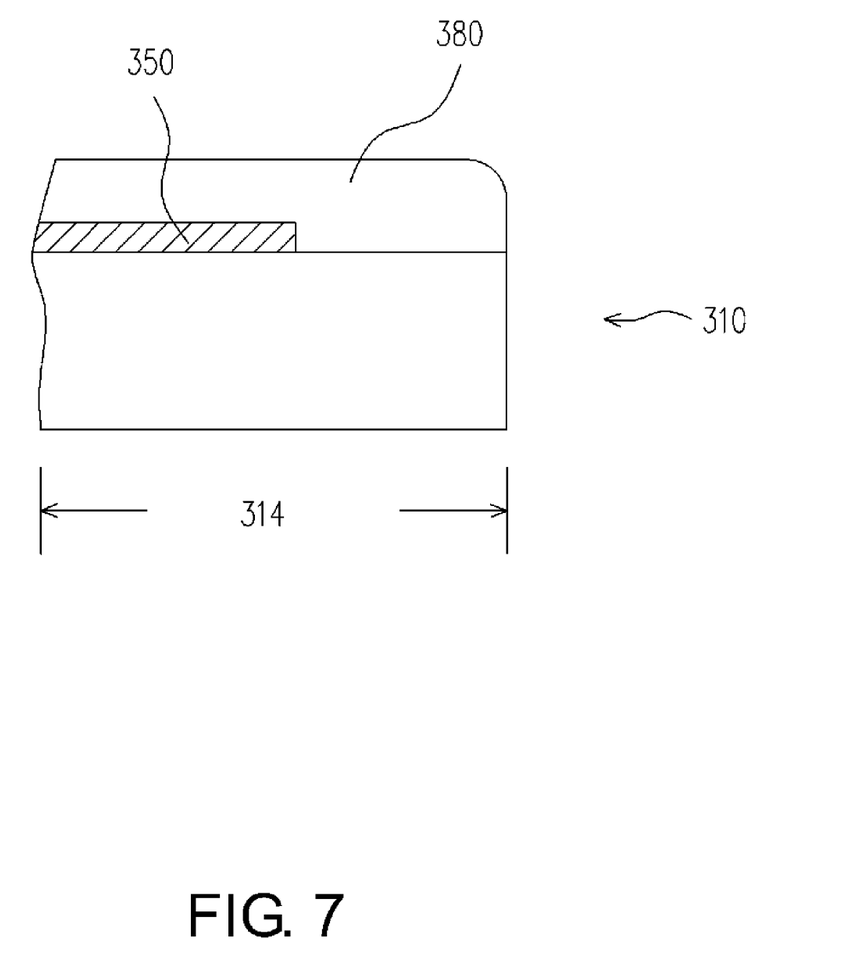
FIG. 7 shows a cross sectional view along line D-D of FIG. 6 after anti-corrosion wirings.

FIG. 6 shows a cross sectional view of a single display module, and FIG. 7 shows a cross sectional view along line B-B of FIG. 6. In this embodiment, the single display module 500 includes the liquid crystal panel structure 300, at least one driving chip 510 (two in this embodiment, includes a gate driving chip and a source/drain driving chip) and a control circuit board 430.

The driving chip 510 is allocated on the driving chip lamination area 316 to electrically connect to the first contact terminals 320, and electrically insulate from the second contact terminals 330. The first contact pads 360 of the first liquid crystal panel 310 is electrically connected to the control circuit board 430 via a soft circuit film 440. As the driving chip 510 is electrically connected to the first contact terminals 320 only, the liquid crystal panel structure 300 is suitable for use in the single display module.

FIG. 7 shows the cross sectional view along line D-D of FIG. 6 after anti-corrosion metal lines are formed. Referring 3, 4, 6 and 7, the second contact pads 370 of the first liquid crystal panel 310 are easily corroded for being exposed. Therefore, before or after the driving chip 510 is allocated in the driving chip lamination area 316, the anti-corrosion metal lines 380 are cut along the dash line C as shown in FIG. 4. As the anti-corrosion metal lines 380 are formed from anti-corrosion material such as indium tin oxide, the second peripheral wirings 350 can be protected by the remaining anti-corrosion lines 380 to prevent corrosion.

Figure 8:
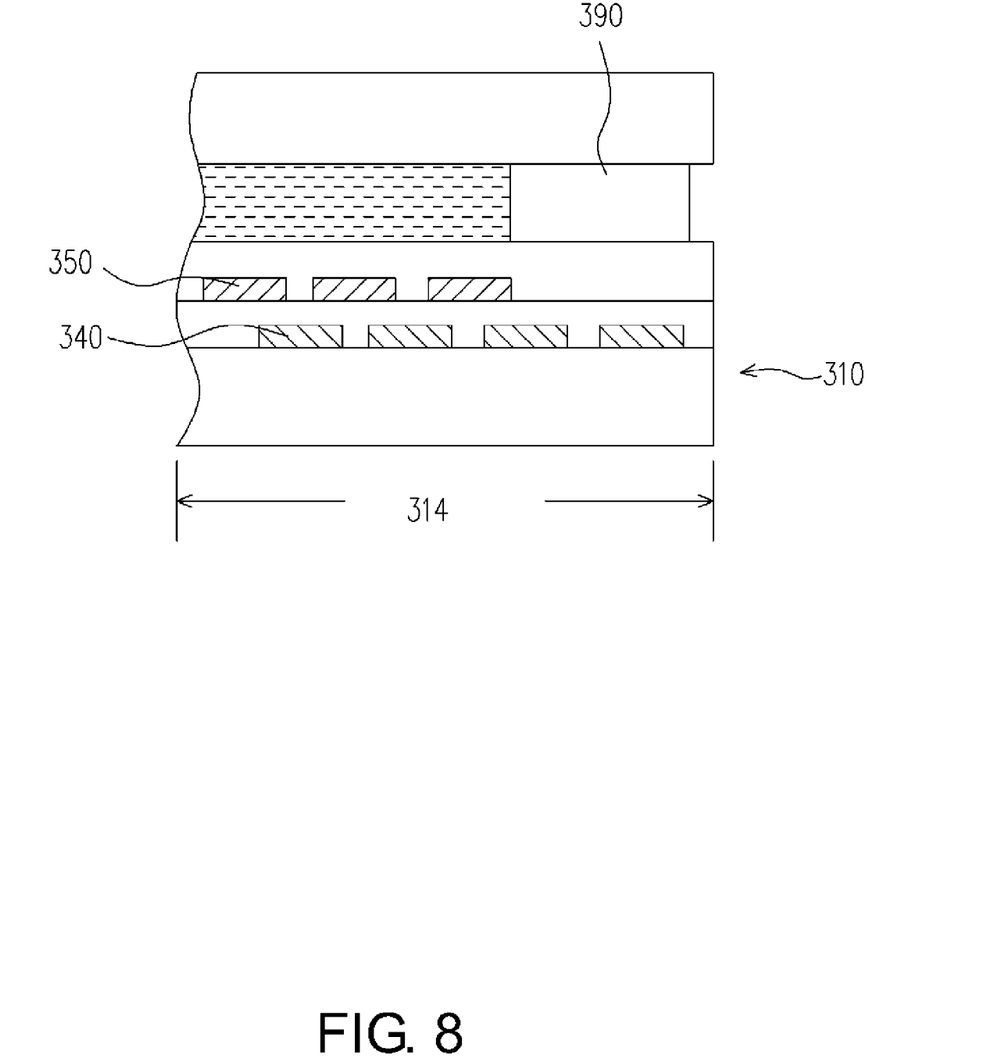
FIG. 8 shows a cross sectional view along line B-B of FIG. 3.

In addition, as the liquid crystal panel structure 300 requires the first and second peripheral wirings 340 and 350 to be allocated in the non-display area 314, a larger area of the non-display area 314 is required when the first and second peripheral wirings 340 and 350 are formed on the second wiring layer. Such design has a poorer space utilization. Therefore, at least a part of the first peripheral wiring 340 and at least a part of the second peripheral wiring 350 can be formed on different wiring layer to reduce the area required for the non-display area 314. Referring to FIG. 8, the first peripheral wirings 340 are allocated on the non-display area 314 of the first liquid crystal panel 310 and the second peripheral wirings 350 are allocated above the first peripheral wirings 340. Thereby, the area of the non-display area 314 is reduced to improve the space utilization. It will be appreciated that the positions of the first and second peripheral wirings can be exchanged or arranged in other manners.

In addition, the non-display area 314 further comprises a resin frame 390 under which a single type of wiring is allocated. In this embodiment, a part of the first peripheral wirings 340 is formed under the resin frame 390 to prevent short circuit between the first and second peripheral wirings 340 and 350 during the lamination process of the resin frame 390.

According to the above, the current application includes at least the following advantages.

1. Two set of contact terminals are formed within the driving chip lamination area to selectively provide allocation of driving chips in two different driving modes. Thereby, the liquid crystal panel structure can be used for both dual and single display modules.

2. When the liquid crystal panel structure is applied to a single display module, the anti-corrosion metal lines serve to be cut provide anti-corrosion protection for the second peripheral wirings.

3. The first and second peripheral wirings can be formed at different layers to improve the space utilization of the non-display area.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A single display module, comprising:
   a liquid crystal panel, including a display area and a non-display area, the display area comprising a plurality of pixels and the non-display area comprising at least one driving chip lamination area;
   a plurality of first contact terminals allocated in the driving chip lamination area;
   a plurality of second contact terminals allocated in the driving chip lamination area and formed around the first contact terminals;
   a plurality of first peripheral wirings allocated in the non-display area to electrically connect the first contact terminals and the pixels of the display area;
   a plurality of second peripheral wirings allocated in the non-display area to electrically connect to the second contact terminals;
   at least one driving chip allocated on the driving chip lamination area and electrically connected to the first contact terminals and insulated from the second contact terminals to drive the liquid crystal panel; and
   a plurality of first contact pads allocated on the non-display area to electrically connect to the first and the second contact terminals, wherein the first contact pads are electrically connected to a control circuit board via a first soft circuit film.

2. The module of claim 1, wherein a part of the first peripheral wirings and a part of the second peripheral wirings are formed in different layers.

3. The module of claim 2, further comprising a resin frame allocated in the non-display area, and either the part of the first peripheral wirings or the part of the second peripheral wirings is formed under the resin frame.

4. The module of claim 1, further comprising a plurality of anti-corrosion conductive lines each being connected to one end of the second peripheral wirings and extended to at least one edge of the liquid crystal panel.

5. The structure of claim 4, wherein the anti-corrosion conductive lines are fabricated from indium tin oxide.

6. A single display module, comprising:
   a liquid crystal panel, including a display area and a non-display area, the display area comprising a plurality of pixels and the non-display area comprising at least one driving chip lamination area;
   a plurality of first contact terminals allocated in the driving chip lamination area;
   a plurality of second contact terminals allocated in the driving chip lamination area and formed around the first contact terminals;
   a plurality of third contact terminals allocated in the driving chip lamination area and formed around the first contact terminals;
   a plurality of first peripheral wirings allocated in the non-display area to electrically connect the first and the third contact terminals and the pixels of the display area;
   a plurality of second peripheral wirings allocated in the non-display area to electrically connect to the second contact terminals;

at least one driving chip allocated on the driving chip lamination area and electrically connected to the first contact terminals and insulated from the second contact terminals to drive the liquid crystal panel; and a plurality of first contact pads allocated on the non-display area to electrically connect to the first, the second and the third contact terminals, wherein the first contact pads are electrically connected to a control circuit board via a first soft circuit film.

7. The module of claim 6, wherein a part of the first peripheral wirings and a part of the second peripheral wirings are formed in different layers.

8. The module of claim 7, further comprising a resin frame allocated in the non-display area, and either the part of the first peripheral wirings or the part of the second peripheral wirings is formed under the resin frame.

9. The module of claim 6, further comprising a plurality of anti-corrosion conductive lines each being connected to one end of the second peripheral wirings and extended to at least one edge of the liquid crystal panel.

10. The structure of claim 9, wherein the anti-corrosion conductive lines are fabricated from indium tin oxide.

* * * * *